United States Patent

Anacker et al.

[15] 3,705,393

[45] Dec. 5, 1972

[54] SUPERCONDUCTING MEMORY ARRAY USING WEAK LINKS

[72] Inventors: Wilhelm Anacker, Yorktown Heights; Hans H. Zappe, Granite Springs, both of N.Y.

[73] Assignee: International Business Machines Corporation, Armonk, N.Y.

[22] Filed: June 30, 1970

[21] Appl. No.: 51,057

[52] U.S. Cl. ....................340/173.1, 307/306
[51] Int. Cl. ....................G11c 11/44, G11c 5/02
[58] Field of Search ....................340/173.1; 307/306

[56] References Cited

UNITED STATES PATENTS 3,452,333 6/1969 Ahrons ....................340/173.1
3,573,759 4/1971 Silver et al....................340/173.1
3,588,777 6/1971 Schroen ....................307/306

*Primary Examiner*—Stanley M. Urynowicz, Jr.
*Attorney*—Hanifin and Jancin and Jackson E. Stanland

[57] ABSTRACT

A superconducting memory array where the memory cells are superconducting rings, each of which has at least one element therein capable of supporting Josephson tunneling current. Coincident currents are used to trap flux in the rings, and to release the trapped flux for readout of the memory cells. Fast operation and tolerable limits on drive currents are possible if one flux quantum operation is used. To achieve single flux quantum operation, the capacitance, inductance, and damping of each memory cell must be within certain limits.

26 Claims, 7 Drawing Figures

INVENTORS
WILHELM ANACKER
HANS H. ZAPPE

BY J. E. S[illegible]
AGENT

SUPERCONDUCTING MEMORY ARRAY USING WEAK LINKS

BACKGROUND OF THE INVENTION

1. Field of the Invention

This invention relates to superconducting memories, and more particularly to such memories in which the presence or absence of trapped flux quantization is representative of stored information.

2. Description of the Prior Art

The principle of Josephson current devices is understood in the prior art, an such devices have been proposed for memory applications. In particular, reference is made to a co-pending application, Ser. No. 744,949, filed July 15, 1968, now Pat No. 3,626,391 and assigned to the same assignee as is the present invention. That co-pending application describes a memory array including a plurality of Josephson Tunneling Devices, wherein each memory cell is comprised of two such Josephson devices. The state of each memory cell is determined by the direction of the circulating current in the cell.

In two technical papers, a superconducting ring containing a barrier (such as a Josephson junction) is studied. In particular, the reaction of superconducting rings having weak links therein to the application of external magnetic fields has been reported by F. Bloch in a paper entitled "Simple Interpretation of the Josephson Effect," which appears in Physical Review Letters, Vol. 21, No. 17, Oct. 21, 1968, on page 241. This paper discusses the Josephson effect in terms of a superconducting ring having a barrier, where the ring is linked with an external magnetic flux.

An article by D. E. McCumber, appearing in J. App. Physics, Vol. 39, No. 6, May 1968, Page 2503, also discusses superconductor weak link junctions and the effect of magnetic fields on these junctions. On page 2507 of this article, McCumber describes a superconducting loop containing a single weak link and mentions that this configuration has potential utility as a memory element.

Although the prior art describes a basic superconducting loop with a weak link, it does not teach how to fabricate a complete memory using such elements. To do so is a difficult problem, and requires a thorough knowledge of memory devices and systems. For instance, these references do not show coincident switching of each memory element and how to form easily fabricated arrays of these memory elements. In addition, the prior art does not teach how to provide high speed operation without unduly excessive drive current requirements.

The cited references do not recognize the critical nature of the damping, inductance, and capacitance of each memory cell which, if not recognized, would make impossible single flux quantum operation of a system. If the parameters of the memory cells are not critically chosen, an oscillation problem will develop and the cells will not switch rapidly and directly from one state to another. If this is so precise readout is impossible.

In order to use a superconducting ring as an efficient memory element, it is necessary to operate the memory array so that a single flux quantum represents a "1", while a "0" is represented by the absence of any flux within the superconducting ring. If more than one flux quanta is to be trapped in the ring at any one time, excessive drive current requirements exist and disturb voltages are created which tend to affect other memory cells. In addition, large amounts of power are required to trap such high flux quantities in the rings. Further, when multiple flux quanta are trapped in the superconducting loops, it is difficult to obtain readout to a state in which no flux quanta are trapped. Often a superconducting loop will relax to a state in which at least one flux quanta is still present. This makes readout difficult, since it is desireable to have the presence of trapped flux indicate a binary 1, and the absence of flux indicate a binary 0.

From the foregoing, it is apparent that a memory array of superconducting loops cannot be designed on the basis of the static characteristics of a Josephson junction. The prior art does not identify the critical parameters of such a memory, nor does the prior art recognize that single flux quantum operation is desirable for efficient operation. In addition, the prior art does not teach how such memory arrays would be fabricated on large scale, integrated basis. Although the prior art suggests the use of a superconducting loop with a weak link as a digital memory element, it does not address such problems as memory speed, power dissipation, disturb voltages, fabrication problems, and drive current tolerances, each of which is a serious consideration in the creation of a new memory system.

Accordingly, it is a primary object of this invention to provide a memory system in which superconducting loops having at least one Josephson current device therein are used as memory elements.

It is another object of this invention to provide a memory system using superconducting loops with Josephson current devices as memory elements which is extremely fast and easily fabricated in thin film, laminate structure, using integrated circuit techniques.

Still another object of this invention is to provide a memory system using superconductive loops with Josephson current devices as memory elements, in which minimum drive current requirements and low power dissipation is achieved.

A further object of this invention is to provide a superconducting memory having coincident drive currents without restrictive tolerances, for switching memory cells.

A still further object of this invention is to provide a superconductive memory in which disturb voltages are minimized.

SUMMARY OF THE INVENTION

This superconducting memory is comprised of a plurality of superconducting memory cells, each of which is a superconductive loop having at least one device capable of supporting a Josephson current. The particular Josephson current device can be a thin film planar device, a point contact junction, a thin film bridge, or a constriction-type weak link. It is only necessary that the particular device be capable of supporting Josephson current. Of course, some Josephson current devices are more easily adapted to large-scale, integrated fabrication techniques and these Josephson devices may be preferrable when a total array is to be fabricated.

Each loop has dimensions and characteristics which satisfy various relationships with respect to damping, inductance, and capacitance. For instance, the relationship between the inductance L of the memory cell and a flux quantum $\phi_0$, defined as $2 \times 10^{-15}$ webers, is $$\tfrac{3}{4}\phi_0 \leq LI_0 \leq 7/4\,\phi_0 \qquad (1)$$

This expression shows the relationship between L and $\phi_0$, in order that only one flux quantum will be trapped when writing information into a memory cell. If inductance L is too small, a flux quantum won't be linked to the superconducting loop while, if inductance L is too large, multiple flux quanta will be trapped in the loop.

The capacitance of the memory cell is comprised of the capacitance of the superconducting loop and of the Josephson device. Since the capacitance of the loop is very small with respect to the capacitance of a planar Josephson device, and is in parallel with the capacitance of the Josephson device, the capacitance of the loop can be neglected. If the capacitance of the Josephson device is too high, there will be oscillation of the energy stored in the capacitance between the electric field associated with the capacitance and the magnetic field associated with the inductance of the superconducting loop.

In order to reduce these oscillations, the capacitance of the loop must be small and there must be damping associated with the Josephson device. The damping is related to the geometry of the Josephson device and, if required, a bridge between the superconducting elements of the device can be provided to affect damping. Generally, the following relationship exists between the damping, capacitance, and inductance of the memory cell in order that one flux quantum operation results.

$$(1/R^2) - (4\,C/L) \geq 0 \qquad (2)$$

Here, the damping is represented by R, while the capacitance is C.

In addition to the memory cells and their particular requirements, means are provided to produce linking flux with each memory cell. This means selectively produces flux linkages with each superconducting loop. In the embodiment shown, coincident current techniques are used to select the particular memory cells and to produce flux linkages in the cells for writing in information and reading out information.

The array of superconducting memory cells and the coincident current means for producing flux linkages in the cell are deposited as thin films on a superconducting ground plane. Connected to the coincident current drive lines are current or voltage sources for producing the currents which establish magnetic fields linking each memory cell. As with all memories, various conventional decoders and address registers are used to select particular memory cells for either the write or read operation.

In this memory, the coincidence of current pulses in lines associated with a particular memory cell will cause sufficient flux linking that memory cell to either trap one flux quantum in the cell (write 1) or no flux quantum (write 0). The coincidence of drive currents also changes the state of the cell in such a way as to cause a voltage signal in a sense line (read). In general, an additional sense line can be provided or one of the coincident current drive lines can be used as a sense line.

The sum of the coincident currents required to switch the state of any memory cell is at least equal to the maximum Josephson current in the memory loop. That is, when the maximum Josephson current is reached, the Josephson device will develop a voltage across it, and a corresponding resistance will develop. This resistance will cause the circulating current in the loop to decrease and a flux quantum will link the loop. If a flux quantum is already present in the loop, then the resistive state of the Josephson device will enable the flux quantum to be expelled from the loop.

Thus, it is apparent that this memory system comprises an array of memory cells which are superconducting loops having at least one Josephson device therein, in combination with coincident selection means for producing linkage flux in the superconductive loops. Single flux quantum operation is provided, in which the presence of a single flux quantum in a loop is indicative of a stored "1", and absence of any flux quantum in the loop is indicative of a stored "0".

By proper selection of each memory cell, high speed operation is possible with minimum power dissipation. Also, the drive current tolerances are large and the drive currents do not create disturb voltages in nonselected memory cells. Further, the memory cells are not put in unstable states where such disturb voltages would cause movement of the state of the cell to an incorrect, although stable, state.

The foregoing and other objects, features and advantages of the invention will be apparent from the following more particular description of the preferred embodiments of the invention as illustrated in the accompanying drawings.

DETAILED DESCRIPTION OF THE PREFERRED EMBODIMENTS

Figure 1:
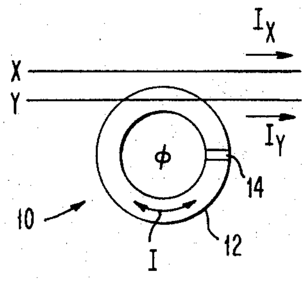
FIG. 1 is a schematic diagram of a memory cell and two drive lines for producing linking flux.

Referring to FIG. 1, a memory element 10 comprising a superconducting loop 12 with a Josephson current device 14 in the loop is shown. This Josephson device can be any thin film junction device, a point contact device, a superconductive constriction, etc. In general, it is a weak link between two superconductors. Located over superconducting loop 12 is a pair of conductors, labeled X and Y. Currents $I_X$ and $I_Y$ flow in the X and Y lines, respectively.

Currents $I_x$ and $I_Y$ produce a magnetic field whose lines of flux $\phi$ link the superconducting loop 12. Due to the presence of the externally applied linking magnetic field, the loop 12 has induced therein a current I which produces a magnetic flux opposing the flux produced by the X and Y conductors. There is developed a voltage $V=d\phi/dt$ if the magnetic flux $\phi$ through the loop varies with time.

The current induced in the superconducting loop 12 increases as the external flux increases in order to prevent this external flux from linking the loop. However, when the current I in superconducting loop 12 becomes equal to the maximum Josephson current $I_0$ which can exist across the Josephson device 14, a voltage developes across the Josephson device and the device becomes resistive. This cause a decrease in the induced loop current I and an amount of flux equal to a multiple of a flux quantum links the loop. A flux quantum is defined as $h/2e=2.07\times10^{-15}$ webers, where $h$ is Planck's constant and e is the electron charge. A flux quantum is defined in terms of natural constants and does not depend upon the geometry of the memory cell. However, the total flux $\phi$ which is linking the loop is a function of the area enclosed by the loop.

Figure 2:
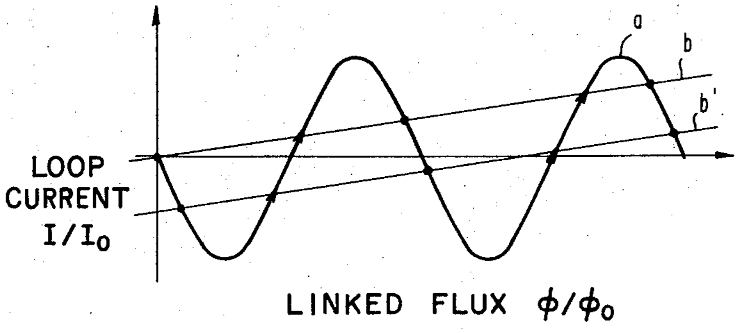
FIG. 2 is a graphical plot of current I in the superconducting loop as a function of flux $\phi$ linking this loop, normalized with respect to the maximum Josephson current $I_0$ and a flux quantum $\phi_0$, respectively.

Fig. 2 is a plot of the current induced in the superconducting loop 12 as a function of the external magnetic field linking loop 12, normalized in terms of $I_0$, the maximum Josephson current in the loop, and $\phi_O$, a unit of flux equal to one flux quantum. Curve (a) in FIG. 2 shows the relation $$I/I_O=-\sin(2\pi\,\phi/\phi_0) \qquad (3)$$

while curve (b) shows the relation $$I/I_O=\kappa(\phi/\phi_O-\phi_{ext.}/\phi_0) \qquad (4)$$

with $$\kappa \quad f(\phi_O/I_0L) \qquad (5)$$

where $\phi$ is the magnetic flux penetrating the ring, $\phi_{ext.}$ is the external flux, and I denotes the circulating current in the superconducting ring. Again, $\phi_0$ is the magnetic flux quantum and $I_0$ is the maximum supercurrent through the weak link 14.

With the barrier present in the superconducting loop, the current induced in the loop varies sinusoidally (curve a) with the flux which is penetrating loop 12. Also, the straight line (b) represents the additional linear dependence of the flux contributed by the induced current itself. The slope of curve $b$ is 1/L, where L is the inductance of the memory cell. As will be apparent later, the amount of flux trapped in a cell is dependent on the inductance of that cell. Further, the contribution to the external flux of the flux created by the induced current in the loop depends upon the dimensions of the superconducting loop. The intersections of curves a and b marked by dots (FIG. 2) represent stable equilibrium conditions with respect to circulating currents and penetrating flux and applied magnetic flux.

In FIG. 2, two straight lines $b$ and $b'$ are shown. Curve $b$ depicts the case when no external magnetic flux $\phi_{ext.}$ is present, while curve $b'$ depicts the situation when an external magnetic flux $\phi_{ext.}$ is present. That is, application of an external magnetic field causes curve $b$ to shift horizontally, which is the same as parallel displacement downward in this particular case. Further, the dots in FIG. 2 represent stable points, while the small triangles represent unstable equilibrium points.

In order to insure that only one flux quantum is trapped in the memory cell, when currents $I_X$ and $I_Y$ are applied coincidentally, the parameters of the memory cell must be carefully selected. That is, the inductance, capacitance, and damping of the memory cell must be chosen so that only one flux quantum will link the memory cell when it is desired to store a "1" in that cell.

As will be more fully apparent later, the most efficient and high-speed operation of the memory cell occurs when only one flux quanta is trapped for representation of an informational "1" state. The "0" state is represented by the absence of any flux quanta trapped in the superconducting loop. Use of a single flux quantum for the memory "one" means that disturb voltages will be minimized and input power requirements will be minimized. In addition, it means that the tolerance margins of the drive currents $I_X$ and $I_Y$ will be relaxed and that other memory cells in the array will not be affected when the desired memory cell is switched.

The superconducting loop has an inductance which must be within minimum and maximum values in order to insure single flux quantum operation. In general, for such operation, the relationship between the inductance L of the memory cell and the flux $\phi$ linking the memory cell has the following relationship:

$$\tfrac{3}{4}\phi_0 \leq LI_0 \leq 7/4\phi_0$$

Figure 3:
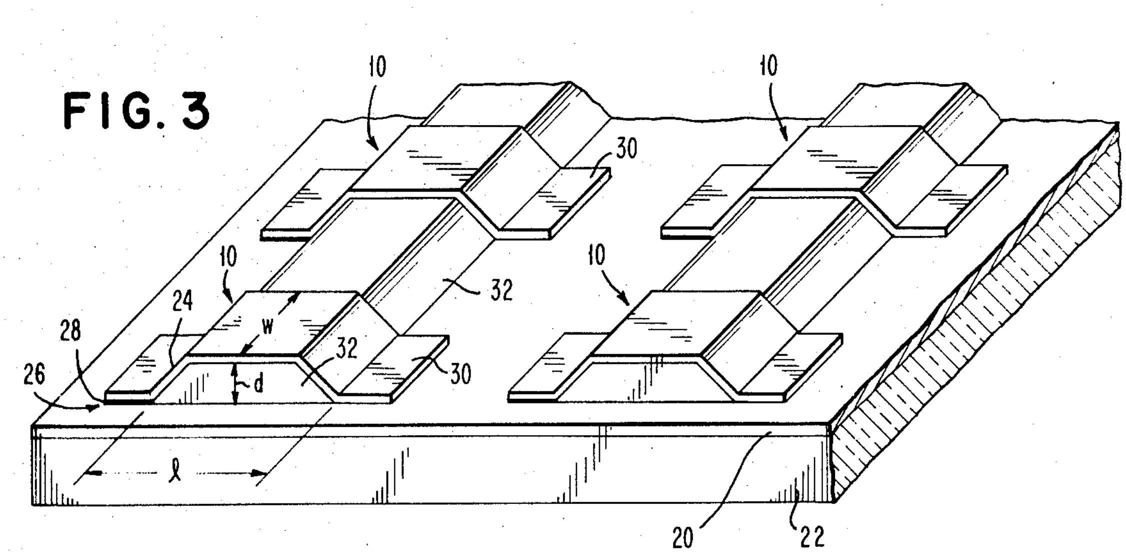
FIG. 3 shows an integrated array of memory cells according to this invention.

The inductance of the memory cell is mainly due to the loop, and is dependent on the geometry of the loop. Inductances which are quite small can be obtained in superconductive loops typically 5 microns in size. For a loop as shown in FIG. 3, the inductance L is related to the permeability $\mu_0$ of the material in the loop center and the geometry of the loop in the following way;

$$L=\mu_0\,dl/w \qquad (6)$$

where $d$ is the height of the loop above the superconducting ground plane, is the length of the loop and $w$ is the width of the loop. In the example above = 10 microns, $w$ = 5 microns and $d$ = 0.5 microns. The inductance relates the current in the loop to the flux enclosed by the loop. The amount of the flux enclosed by the loop is dependent upon the geometry of the loop.

If the inductance L is too low, a flux quantum will not enter the ring when the current is equal to the maximum Josephson current in the loop. If the inductance is too high, more than one flux quantum will be trapped in the loop when the drive currents are equal to the maximum Josephson current in the loop. This will cause excess restraints on the drive current tolerances and extra power dissipation. Further, it will induce disturb voltages which will interfere with other memory cells than that selected.

The capacitance of the memory cell is the capacitance of the superconducting loop and the Josephson device. These capacitances are in parallel and the capacitance of the loop is very small in comparison to that of the Josephson device, so it can be neglected in design considerations. If the current through the loop equals or exceeds the maximum Josephson current, a voltage will develop across the capacitance in the Josephson device and energy will be stored in this capacitance. The electrical energy stored in the capacitance will transfer to the magnetic energy in the electrical field associated with the inductance of the loop. If the capacitance is too high, this transfer of energy is oscillatory and severely interferes with the maximum speed and operation of the memory cell. Further, it is very difficult to determine how many flux quanta are stored in the memory cell. In order to prevent these transitory oscillations, the memory cells should have some damping associated with the Josephson device. The relationship which holds for single quantum operation is the following:

$$(1/R_2) - (4C/L) \geq 0$$

where R is the damping, C is the capacitance, and L is the inductance of the memory cell. The damping is a function of the Josephson device and can be somewhat controlled by adding resistive material to the Josephson barrier or by bridging the Josephson junction. For instance, it is possible to create a metal bridge across the Josephson barrier to influence the resistance of the junction.

If the above relationships are not maintained, it will be impossible to make one flux quantum link the superconducting loop or, alternately, more than one flux quantum will link the loop. Either case is undesirable, since no information will be stored in the memory in the first case, while the information stored in the second case creates unduly restrictive requirements on the drive currents. For instance, if more than one flux quantum links the superconducting loop, the drive currents necessary to create multiple flux quanta are sufficient to disturb memory cells other than that which is selected. Also, these drive currents are large and dissipate considerable amounts of heat. Another disadvantage of such large drive currents is that the speed of operation of the memory cells is slow when large currents are used, since they must drive a finite inductance of the superconducting loop.

FIG. 3 shows an array of memory cells, each of which is comprised of a superconducting loop having a damped Josephson tunneling junction in the loop. In more detail, memory cells 10 are located on superconducting ground plane 20, which is supported by substrate 22. The length of the superconducting loop 24 is *l*, the height of the loop above the ground plane is *d*, and the width of the superconducting loop is *w*. By altering these parameters in accordance with equation 6, the inductance of the loop 24 can be adjusted to insure one quantum operation.

The damped Josephson tunneling junction 26 is a conventional Josephson junction in which two superconductors are separated by a thin tunneling barrier 28 of thickness 2–50 angstroms. Usually, the tunnel barrier is an oxide of one of the superconductors and is approximately 10–30 angstroms in thickness. Such Josephson junctions are described in the following references:

J. Matisoo, Proced. of IEEE, Vol. 55, No. 2, February 1967, pp. 172–180;

J. Matisoo, Analytical Chemistry, Vol. 41, January 1969, pp. 83A–86A; and Vol. 41, February 1969, pp. 139A–142A.

Figure 6:
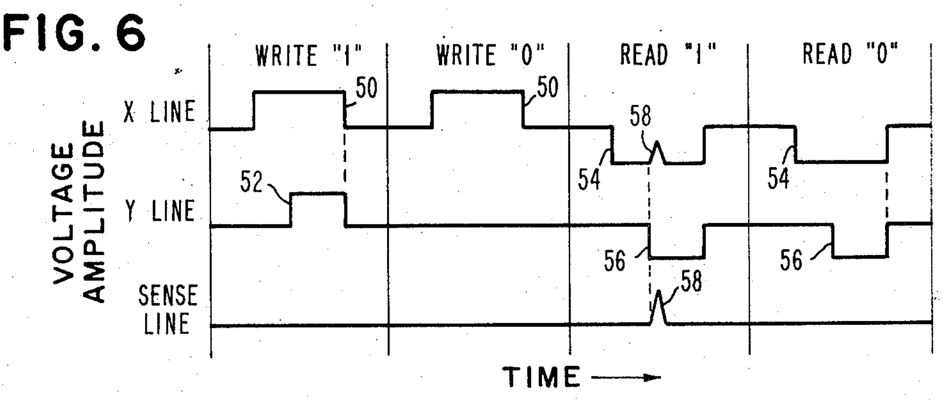
FIG. 6 is a pulse timing diagram for read and write operation of this device.

The material used to fabricate the memory cell loop 24 is any superconductor such as N*b*, P*b*, S*n*, etc. The memory cells 10 are formed by depositing superconductive film strips 30 onto strips 32 of insulating material of appropriate length and thickness *d*. Weak superconductive links in each loop are formed by forming thin Josephson tunneling junctions 26 on one side of the insulating strips 32 or by the means shown in FIG. 3A, which will be described later. Generally, superconductive ground plane 20 is thermally oxidized to about 15–30 A., and then one of the oxidization sites is cleaned, to leave only one tunnel barrier. After formation of the memory cells, X and Y drive lines and a sense line (if desired) having an appropriate geometry are then deposited on top of the structure. The X and Y drive lines are insulated from one another and from the memory cells. Either of the X or Y drive lines can function as a sense line, as will be apparent when FIG. 6 is discussed.

The various superconducting leads in the memory array can be easily deposited by well-known techniques, as can be seen by reference to aforementioned Ser. No. 744,949.

The inductance L of each superconducting loop is adjusted by varying the thickness of the insulation 32, the length *l* of the loop, and the width *w* of the overlaid superconductive strips. Extremely high bit densities can be achieved since inductances in the range of $10^{-13}$ Henries can be obtained in superconductive loops having typical sizes of $w = 5$ microns, $l = 10$ microns, and $d = 0.5$ micron.

Figure 3A:
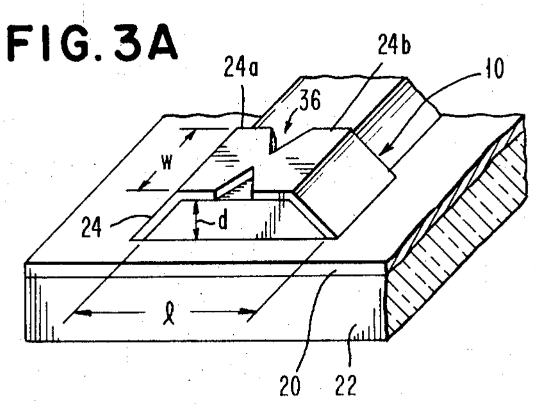
FIG. 3A shows a constriction-type weak link device which can be used in the array of FIG. 3.

FIG. 3A shows an alternate memory cell in which a constriction-type weak link is provided. In this discussion, the same reference numerals will be maintained, where possible. In this memory cell, the Josephson tunneling junction 26 of FIG. 3 is not required, since the constriction 36 in the superconducting loop 24 serves as the weak link between superconducting parts **24*a* and 24*b*. As in FIG. 3, each of the cells 10 is deposited on a superconducting ground plane 20 supported by a substrate 22. In general, any type of weak link between superconducting elements in a loop is suitable for a memory cell. The overlying drive lines will provide flux which links the memory cells 10**, i.e., threads the loops.

Figure 4:
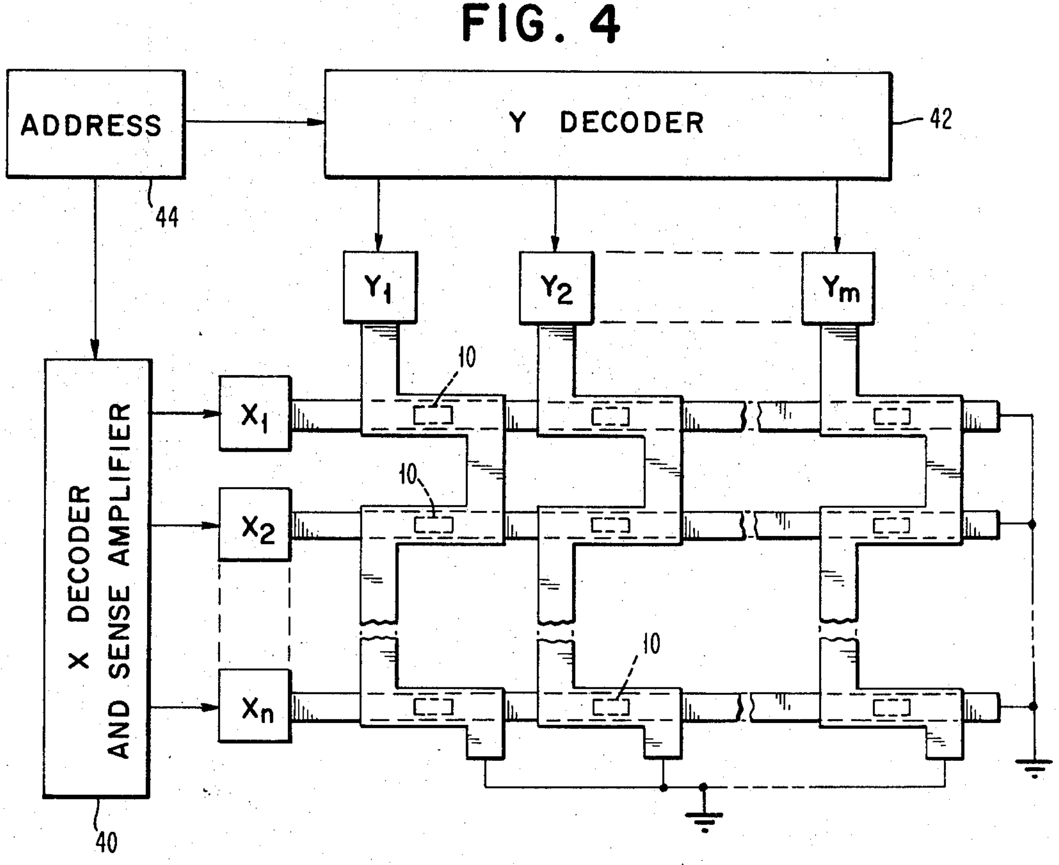
FIG. 4 shows the coincident drive lines for the array of FIG. 3.

FIG. 4 shows an arrangement of coordinately placed X drive lines X1, X2, . . . , **X*n* and Y drive lines Y1, Y2, . . . , Y*m***. These drive lines furnish current in the vicinity of each memory cell and the current in the drive lines establishes magnetic flux linking each memory cell. The combination of the currents in the X and Y drive lines is sufficient to change the state of the superconducting memory element at those locations where coincident X and Y currents are impressed.

In FIG. 4, a superconducting ground plane has various memory elements 10 deposited thereon. These memory elements are, for example, those shown in either FIG. 3 or FIG. 3A. Located over the memory elements are the X and Y drive lines, which are superconductors. If desired, these drive lines can be deposited on a layer of insulating material. In the latter case, the memory cells would then be deposited over the X and Y drive lines, being separated from the drive lines by an insulating layer. Then a ground plane would be deposited, if desired.

In FIG. 4, the X and Y drive lines are shown together with their associated decoded circuits 40 and 42, respectively. These decoder circuits and the address circuit 44 are well known and are those which are conventionally used with memory arrays.

Located below the X and Y drive lines are the memory cells 10. The X and Y drive lines carry currents which produce an additive magnetic field that threads the superconducting loops in the memory cells. The Y drive lines are the word lines, while the X drive lines are the common bit lines for the memory cells.

If desired, a common sense line can be provided for each row of memory cells, or the X lines can serve as the bit-sense lines, in a manner well known in the art. Correspondingly, the Y conductors can serve as common sense lines, also. For ease of drawing, the sense amplifier is shown as being associated with X-decoder 40.

The Y conductors are connected to decoder 42, which in turn is connected to address register 44. Connected to the X conductors is bit decoder 40, which is also provided with inputs from the address register 44. Both the word lines Y and the bit lines X are connected to separate common grounds.

OPERATION OF MEMORY

Figure 5:
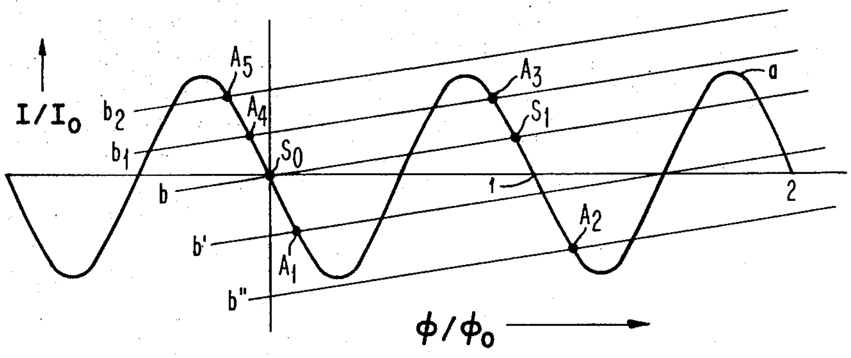
FIG. 5 shows a graphical plot of current I in the superconducting loop versus the magnetic flux $\phi$ linking this loop, for various coincident drive currents.

FIG. 5 shows a graphical illustration of current in a memory loop as a function of flux $\phi$ linking that loop. In particular, the curves for different amounts of linkage flux $\phi$ are shown.

As stated previously, the sinusoidal curve (a) represents the periodic dependence of the circulating loop current I on the flux $\phi$ linking the loop, while the straight line (b) represents the linear dependence on the flux contributed by the loop current itself. This line (b) undergoes a parallel displacement in the presence of a contribution from an external magnetic field. These displacements can be represented by the curves $b'$ and $b''$ (which are used to explain the WRITE operation) and the curves $b_1$ and $b_2$ (which are used to explain the READ operation). The slope of the lines $b$ is the reciprocal of the inductance L of the memory cell.

A binary "0" is stored in a cell when the cell is in the state $S_0$ characterized by zero circulating current I and zero penetrating field $\phi$. A stored binary "1" is represented by state $S_1$ in which a finite super-current I circulates in the loop and a finite amount of flux $\phi$ penetrates the interior of the loop. The circulating current and penetrating flux are of such magnitude as to add up to a single flux quantum of $2 \times 10^{-15}$ Webers.

Flux quantization is present here, although the flux corresponding to the point $S_1$ is not quite that of a flux quantum. The actual flux in position $S_1$ is determined by the inductance of the loop and, for infinite inductance, would be one flux quantum. However, the stable solutions to both the linear curve (b) and the sinusoidal curve (a) occur at those points which coincide with both lines, and these points are located near multiples of flux quanta.

The slope of line $b$ in FIG. 5 corresponds to the inductance L of the loop and the inductance L is chosen for optimum tolerance margins, as explained previously. Generally, the line b intersects curve A at about 1/3 $I_0$ at point $S_1$. Lines $b'$ and $b''$ represent operational conditions during writing, while lines $b_1$ and $b_2$ represent operational conditions during reading, in the coincidental selection mode.

Writing

Assuming that the superconducting loop is initially in state $S_0$, the application of an external magnetic field of approximately $2\phi_0$ (line $b'$) to the superconducting cell 10 shifts it into state $A_1$. After removal of the external flux the cell returns to state $S_0$. This operation is equivalent to a half-select excitation.

If an external flux of double magnitude (line $b''$) is applied, the superconducting cell will be discontinuously shifted into state $A_2$, which will cause trapping of a single flux quantum $\phi_0$. When the external flux is removed, the superconducting loop will relax from state $A_2$ to state $S_1$. This operation corresponds to the writing of a binary "1."

Reading

Destructive readout of the information in a memory cell requires external flux in the opposite direction. Line $b_1$ corresponds to a half-select read situation. Applying an oppositely directed flux of this magnitude will shift the superconducting cell to state $A_3$ if it were in state $S_1$. It will shift the loop into state $A_4$ if it were in state $S_0$ initially. Upon removal of the external flux, the superconducting loop relaxes to states $S_1$ and $S_0$, respectively. During this operation, sense voltages are induced in an appropriate sense line (either the X or Y drive lines, or a separate sense line overlying the memory cells), the integrals of which are zero over a total read cycle. That is, there is no (negligible) sense output.

Full select read excitation corresponds to line $b_2$. In this case, a sufficient oppositely directed external flux penetrates the memory cell and shifts it to state $A_5$, whether it was initially in state $S_0$ or state $S_1$. Upon removal of this external flux, the loop will relax to state $S_0$. The flux quantum which had been trapped (if the loop were initially in state $S_1$) is expelled, thus inducing a sense signal in the sense line, the integral of which is finite over the total read cycle. If the loop were initially in state $S_0$ and were shifted to state $A_5$, it would relax back to state $S_0$ upon removal of the external flux. Reversible flux changes would then be encountered and the sense voltage integral would be zero over the total read cycle. This would be readout of a binary "0."

As is well known in the art, the memory array could be written into word-by-word by energizing the appropriate word lines Y and the desired bit lines X. Also, multiple memory cells can be read out at one time by appropriate selection of the X and Y conductors.

FIG. 6 shows a timing pulse diagram for operation of the memory array. The current pulses appearing on the X line, Y line, and sense line are shown for operations in which both a "1" and a "0" are written into memory, as well as for the reading operations in which these binary values are read-out.

For both writing and reading information, the current directions are the same in the X and Y lines which are associated with each memory cell 10. That is, the currents in the X and Y lines associated with each memory cell must each produce flux in the same direction through the memory cell. For instance, if the positive Y direction is downward in FIG. 4, then for all Y currents in the downward direction, the X-line currents will be in alternate directions in alternate lines. In this case, the current direction in X1 would be to the right, the current direction in X2 would be to the left, etc.

For writing a "1" into memory, a pulse 50 is applied to the appropriate X conductor and a coincident pulse 52 is applied to the appropriate Y conductor. In this diagram, pulse 50 is wider than Y pulse 52 so that sensing of the output pulses can be accomplished on the X conductors.

To write a "0", a pulse is applied to either the X conductor or the Y conductor, rather than to both conductors. In FIG. 6, only an X pulse 50 is applied. This corresponds to a half-select operation, as explained above. Of course, there could be an absence of pulses on both the X and Y conductors when writing a "0" into the memory.

For all writing operations, coincident clearing pulses are applied on the X and Y conductors to insure that selected memory cells are in the zero state. These clearing pulses are identical or equivalent to the reading pulses.

When reading a binary "1", a pulse (54, 56) is applied to the X and Y conductors respectively. When these pulses overlap, a sense voltage will be induced in the sense line when the trapped flux quantum is expelled from a superconducting loop. This will produce a small pulse 58 on the sense line, which could be the X line in this case. This would correspond to the small current decrease on the X conductor, as shown here.

To read a stored "0", pulses 54, 56 are again applied to both the X and Y conductors. If a "0" is stored in memory, only a negligible current ripple will be produced on the sense line.

Destructive read-out requires a re-write operation under the control of the output circuit, if the same information is to be returned to the memory cells which were read-out. This is a conventional technique which uses well-known hardware.

Either the X conductor or the Y conductor can be used as common sense lines. If this is done, the pulse applied to the X or Y conductor to be used as a sense line is applied before the pulse to the other drive conductor. This will insure that the change due to readout of a "1" or "0" can be detected on the drive conductor chosen to be the sense line. For instance, in FIG. 6, the X conductor is to be the sense conductor so the pulses applied to that line occur before the pulses applied to the Y conductors. When the pulses are coincident, readout will occur.

What has been shown is a superconducting memory where the memory cells are comprised of superconducting loops having weak links therein. These weak links can take a variety of forms, such as Josephson tunnel junctions and constrictions in the superconducting loops. To fabricate a memory of such loops, the loops must have particular geometries in order to provide one flux quantum operation. Operation with a single flux quantum representing a binary "1" and the absence of a flux quantum representing a "0" is the most efficient operation. It reduces the drive current requirements and allows greater tolerances on these currents.

While the invention has been shown and described in terms of the embodiments presented, it should be appreciated that other weak links can be used in the superconducting loops of each memory cell. Also, more than one weak link can be used in each loop. This may have the advantage that a greater output signal will be provided, as long as the weak links can be suitably matched. Also, the superconducting ground plane may also serve as the supporting substrate, if desired. These variations are very apparent to those skilled in memory design, and the numerous ways in which the memory can be fabricated are also apparent to memory designers. Since the memory drive lines (X, Y) do not intersect the individual superconducting loops, a variety of fabrication technologies can be employed. In particular, semiconductor and thin film technologies are particularly useful.

What is claimed is:

1. A superconducting memory, comprising:

a plurality of superconducting loops, each one of which has at least one element therein capable of supporting a Josephson current therethrough, said loops being capable of trapping magnetic flux quanta therein as representations of a data information state, each loop being characterized by inductance L, capacitance C, and damping R where $$\tfrac{3}{4}\phi_0 \leq LI_0 \leq 7/4\,\phi_0\text{, and}$$

$$(1/R^2) - 4C/L) \geq 0$$

where $\phi_0$ is a magnetic flux quantum equal to $2.07 \times 10^{-15}$ webers and $I_0$ is the maximum Josephson current which the loop can sustain;

information producing means for generating a single flux quantum in selected loops, said flux quantum being indicative of said information state;

selection means connected to said information producing means for selecting which superconducting loops are linked by said magnetic flux, said selection being in accordance with a predetermined data format.

2. The memory of claim 1, where said generating means comprises coincidentally driven lines located near each said superconducting loop, and current sources for providing currents in said lines, the total current in said lines near each said loop being sufficient to cause linking of one flux quantum in said loop.

3. The memory of claim 2, where said drive lines are arranged in X–Y coordinate fashion, said X lines and said Y lines producing magnetic flux which links each superconducting loop in the same direction.

4. The memory of claim 2, further comprising sense lines for detecting the magnetic flux trapped in said superconducting loops, said sense lines being comprised of said coincidentally driven lines.

5. The memory of claim 2, further comprising sense lines for detecting the magnetic flux trapped in said superconducting loops, said sense lines being located near each said superconducting loop.

6. The memory of claim 2, wherein each said drive line is connected to a current source for providing current in each said line, and each said loop has a plurality of drive lines thereacross, the total current in said plurality of drive lines across each superconducting loop being sufficient to induce a current in each loop of a magnitude which is greater than the maximum Josephson current of the Josephson device of each loop.

7. The memory of claim 2, where said selection means comprises at least one address unit and decoders connected to said drive lines, said address unit and said decoders connecting said current sources to selected drive lines.

8. The memory of claim 1, where said superconducting loops are located on a superconducting ground plane, each loop having a thin film, planar Josephson device therein.

9. The memory of claim 1, where said superconducting loops are located on a superconducting ground plane, each loop having a constriction-type weak link Josephson device therein.

10. A superconducting memory array, comprising:

a plurality of superconducting memory cells located on a superconducting ground plane, each of said cells comprising a ring of superconducting material having at least one superconducting weak link therein, said weak link being capable of supporting Josephson current therethrough, each said cell being characterized by an inductance L, capacitance C, and damping R, where $$\tfrac{3}{4}\phi_0 \leq LI_0 \leq 7/4\phi_0 \text{, and}$$

$$(1/R_2) - (4C/L) \geq 0$$

where $\phi_0$ is a flux quantum defined as 2.07 × 10⁻¹⁵ webers and $I_0$ is the maximum Josephson current which the loop can sustain;

generating means located near said cells for producing magnetic flux which threads each said cell, said generating means producing sufficient flux to trap a single flux quantum in said cell, and to cause expulsion of said trapped flux;

selection means connected to said generating means for selecting which of said memory cells is to be threaded by said magnetic flux;

sensing means for detecting the presence of trapped flux in each said memory cell, said sensing means being responsive to said selection means for sensing the flux trapped in selected memory cells, wherein said generating means comprises a group of drive lines for each memory cell, each drive line being connected to a current source for producing drive currents in said lines, wherein the total current in each said group of drive lines is sufficient to cause trapping of a flux quantum in said memory cells.

11. The memory of claim 10, wherein said selection means comprises address means and decoder means connected to said current sources for selectively biasing said drive lines.

12. The memory of claim 11, wherein said drive lines are arranged in coordinate fashion across said array and are coincidentally biased by said selection means and said generating means, each said group of drive lines being located on one side of the associated memory cell.

13. A superconducting memory, comprising:

a superconducting ground plane;

a plurality of discrete insulating layers located on said ground plane, said layers extending in a first direction across said ground plane;

a plurality of discrete superconducting film strips on each said insulating layer, said film strips extending in a second direction and contacting said superconducting ground plane in at least one location;

Josephson current devices, there being at least one of said devices in each superconducting film strip;

thin film superconducting drive lines located over each said film strip and insulated therefrom;

current sources connected to said drive lines for generating current pulses in said drive lines;

selection means connected to said current sources for selectively connecting said current sources to said drive lines.

14. The memory of claim 13, wherein said drive lines are arranged in coordinate fashion, there being a plurality of said drive lines located over each said film strip.

15. The memory array of claim 13, wherein said current sources and drive lines produce magnetic flux in said insulating layers in the vicinity of said film strips, the amount of magnetic flux produced by said current sources and said drive lines being approximately a single flux quantum of $2.07\times10^{-15}$ webers.

16. The memory of claim 13, wherein each said discrete film strip forms a superconducting loop with said ground plane, said loops being characterized by a capacitance C, inductance L, and damping R given by $$\tfrac{3}{4}\phi_0 \leq LI_0 \leq 7/4\,\phi_0 \text{, and}$$

$$(1/R^2) - (4C/L) \geq 0$$

where $\phi_0$ is a flux quantum of $2.07 \times 10^{-15}$ webers.

17. The memory array of claim 13, where each said Josephson device is a thin film junction device having a tunnel barrier located between said ground plane and each of said film strips.

18. The memory array of claim 13, wherein said Josephson devices are constriction-type devices formed in said film strips, each said constriction device being characterized by a region in said strip having less width than the surrounding strip.

19. A superconducting memory, comprising:

a superconducting ground plane;

a first layer of spaced insulating strips extending across said plane in a first direction;

a layer of spaced superconducting strips having Josephson current devices therein, said superconducting strips being deposited on said insulating strips, said superconducting strips extending in a second direction;

a second layer of insulation located over each said superconducting strip;

a first layer of superconducting drive lines located over each said superconducting strip, the current flow in said drive lines producing magnetic flux which threads the volume between said superconducting strips and said ground plane;

a third layer of insulation deposited on said drive lines;

a second layer of superconducting drive lines located over each said superconducting strip, the current flow in said second layer drive lines producing magnetic flux which threads the volume between said superconducting strips and said ground plane;

current sources connected to said fourth layer of drive lines and to said second layer of drive lines for producing current in said second layer of drive lines;

selection means connected to said current sources for coincidentally connecting groups of said drive lines of said current sources;

sensing means for detecting the magnetic flux which threads each said volume between said superconducting strips and said ground plane.

20. The memory of claim 19, wherein each superconducting strip forms a memory loop with said ground plane, each said memory loop having an insulating strip therein and being characterized by inductance L, capacitance C, and damping R given by $$\frac{3}{4}\phi_0 \leq LI_0 \leq 7/4\,\phi_0\text{, and}$$

$$(1/R^2)-(4C/L) \geq 0$$

where $\phi_0$ is a flux quantum equal to $2.07 \times 10^{-15}$ webers.

21. The memory of claim 19, wherein said first layer of drive lines extends in a direction transverse to said second layer of drive lines.

22. A superconducting memory, comprising:

a superconducting ground plane;

a plurality of memory cells located over said ground plane, each said memory cell comprising:

a layer of insulating material formed on said ground plane and a strip of superconducting material located over said insulating material, said superconducting strip and said ground plane forming a loop having said insulating material therein;

a superconducting weak link capable of supporting Josephson current therethrough;

magnetic flux generating means for linking flux in each said loop, said generating means comprising superconducting drive lines insulated from said memory cells and electrical sources connected to said drive lines for producing current pulses therein;

selection means for selectively connecting said current sources to said drive lines;

sensing means for detecting the amount of flux which links each said loop.

23. The memory of claim 22, wherein each Josephson device is a planar device having an electron tunnel barrier formed between said ground plane and each superconducting strip.

24. The memory array of claim 22, wherein each Josephson device is a constriction-type device formed in each superconducting strip.

25. The memory of claim 22, wherein each loop has inductance L, capacitance C, and damping R characterized by $$\frac{3}{4}\phi_0 \leq LI_0 \leq 7/4\,\phi_0\text{, and}$$

$$(1/R^2)-(4C/L) \geq 0$$

where $\phi_0$ is a flux quantum equal to $2.07 \times 10^{-15}$ weber.

26. The memory of claim 22, where said drive lines are arranged in X and Y coordinate fashion, there being an X line and a Y line located in flux linking relationship to each said loop, the sum of currents in each flux-linked group of X and Y conductors being sufficient to produce a linking flux quantum in each said loop.

* * * * *